US010015536B2

(12) United States Patent
Tsurumoto et al.

(10) Patent No.: US 10,015,536 B2
(45) Date of Patent: Jul. 3, 2018

(54) CONTENT-DISPLAY SCHEDULING SYSTEM AND CONTENT-DISPLAY SCHEDULING METHOD

(75) Inventors: Shinichi Tsurumoto, Tokyo (JP); Kenichi Ishiguri, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/354,974

(22) PCT Filed: Nov. 4, 2011

(86) PCT No.: PCT/JP2011/075470
§ 371 (c)(1),
(2), (4) Date: Apr. 29, 2014

(87) PCT Pub. No.: WO2013/065181
PCT Pub. Date: May 10, 2013

(65) Prior Publication Data
US 2014/0289766 A1 Sep. 25, 2014

(51) Int. Cl.
*H04N 21/414* (2011.01)
*H04N 21/20* (2011.01)
(Continued)

(52) U.S. Cl.
CPC ...... *H04N 21/26266* (2013.01); *B61L 15/009* (2013.01); *B61L 15/0072* (2013.01);
(Continued)

(58) Field of Classification Search
CPC ........... H04N 21/414; H04N 21/41415; H04N 21/41422; H04N 21/20; H04N 21/21;
(Continued)

(56) References Cited

U.S. PATENT DOCUMENTS 5,955,710 A * 9/1999 DiFranza ................. B66B 1/34
187/247
6,810,527 B1 * 10/2004 Conrad ................. H04N 7/163
348/E7.061
(Continued)

FOREIGN PATENT DOCUMENTS

JP 2003-263124 A 9/2003
JP 2005-149188 A 6/2005
(Continued)

OTHER PUBLICATIONS

International Search Report (PCT/ISA/210) dated Dec. 20, 2011, by the Japanese Patent Office as the International Searching Authority for International Application No. PCT/JP2011/075470.
(Continued)

*Primary Examiner* — Benjamin R Bruckart
*Assistant Examiner* — Akshay Doshi
(74) *Attorney, Agent, or Firm* — Buchanan Ingersoll & Rooney PC

(57) ABSTRACT

There are provided a news/weather-forecast editing device that updates content with a high real-time sensitivity and information that constitutes an external program listing; a news/weather-forecast dedicated distribution server that creates an external program listing showing a display order of the content with a high real-time sensitivity, an advertisement-content editing device that updates content with a low real-time sensitivity and an advertisement program listing, which shows a display order of the content with a low real-time sensitivity and also a display order that follows the external program listing; a content database that stores therein the content and the program listings; a distribution server that periodically checks the content database and distributes updated content and program listings; and individual distribution devices that distribute content and program listings that have been distributed from the distribution
(Continued)

server to vehicles that display the content according to the display order.

10 Claims, 3 Drawing Sheets

(51) Int. Cl.
*H04N 21/262* (2011.01)
*H04N 21/2665* (2011.01)
*H04N 21/214* (2011.01)
*H04N 21/81* (2011.01)
*H04H 20/62* (2008.01)
*B61L 27/00* (2006.01)
*B61L 15/00* (2006.01)

(52) U.S. Cl.
CPC ......... *B61L 27/0077* (2013.01); *H04H 20/62* (2013.01); *H04N 21/20* (2013.01); *H04N 21/2146* (2013.01); *H04N 21/2665* (2013.01); *H04N 21/414* (2013.01); *H04N 21/41415* (2013.01); *H04N 21/41422* (2013.01); *H04N 21/812* (2013.01); *B61L 15/0027* (2013.01); *B61L 15/0036* (2013.01)

(58) Field of Classification Search
CPC ...... H04N 21/2146; H04N 7/18; H04N 7/106; H04H 20/62; B60R 11/0235; B64D 11/0015
See application file for complete search history.

(56) References Cited

U.S. PATENT DOCUMENTS

| | | | | |
|---|---|---|---|---|
| 7,814,145 | B2* | 10/2010 | Lundy | G06Q 30/00 709/201 |
| 8,595,776 | B2 | 11/2013 | Takada et al. | |
| 2006/0130100 | A1 | 6/2006 | Pentland | |
| 2008/0060003 | A1* | 3/2008 | Nocifera | G06Q 30/02 725/35 |
| 2008/0092162 | A1 | 4/2008 | Lundy et al. | |
| 2008/0250095 | A1* | 10/2008 | Mizuno | G06F 17/30861 709/201 |
| 2011/0252450 | A1* | 10/2011 | Adrick | H04N 21/2221 725/62 |

FOREIGN PATENT DOCUMENTS

| | | |
|---|---|---|
| JP | 2009-107359 A | 5/2009 |
| JP | 2010-52581 A | 3/2010 |
| JP | 4679676 B2 | 4/2011 |
| WO | 2008/024972 A2 | 2/2008 |
| WO | 20081028167 A1 | 3/2008 |
| WO | 20101144054 A1 | 12/2010 |

OTHER PUBLICATIONS

Written Opinion (PCT/ISA/237) dated Dec. 20, 2011, by the Japanese Patent Office as the International Searching Authority for International Application No. PCT/JP2011/075470.
The extended European search report dated Jun. 17, 2015, by the European Patent Office in corresponding European Patent Application No. 11875180.9-1810. (10 pages).
European Office Action corresponding to European Patent Application No. 11875180.9, dated Dec. 23, 2015; 12 pages.
Communication pursuant to Article 94(3) EPC dated Jun. 22, 2016, by the European Patent Office in corresponding European Patent Application No. 11 875 180.9-1810. (10 pages).
First Office Action dated Oct. 10, 2016, by the Chinese Patent Office in corresponding Chinese Patent Application No. 201180074575.2 and English translation of the Office Action. (16 pages).
Summons to attend oral proceedings pursuant to Rule 115(1) EPC issued on Aug. 1, 2017, by the European Patent Office in corresponding European Patent Application No. 11875180.9 (8 pages).
Office Action issued by the European Patent Office dated Jan. 30, 2017 in corresponding European Application No. 11875180.9 (9 pages).

* cited by examiner

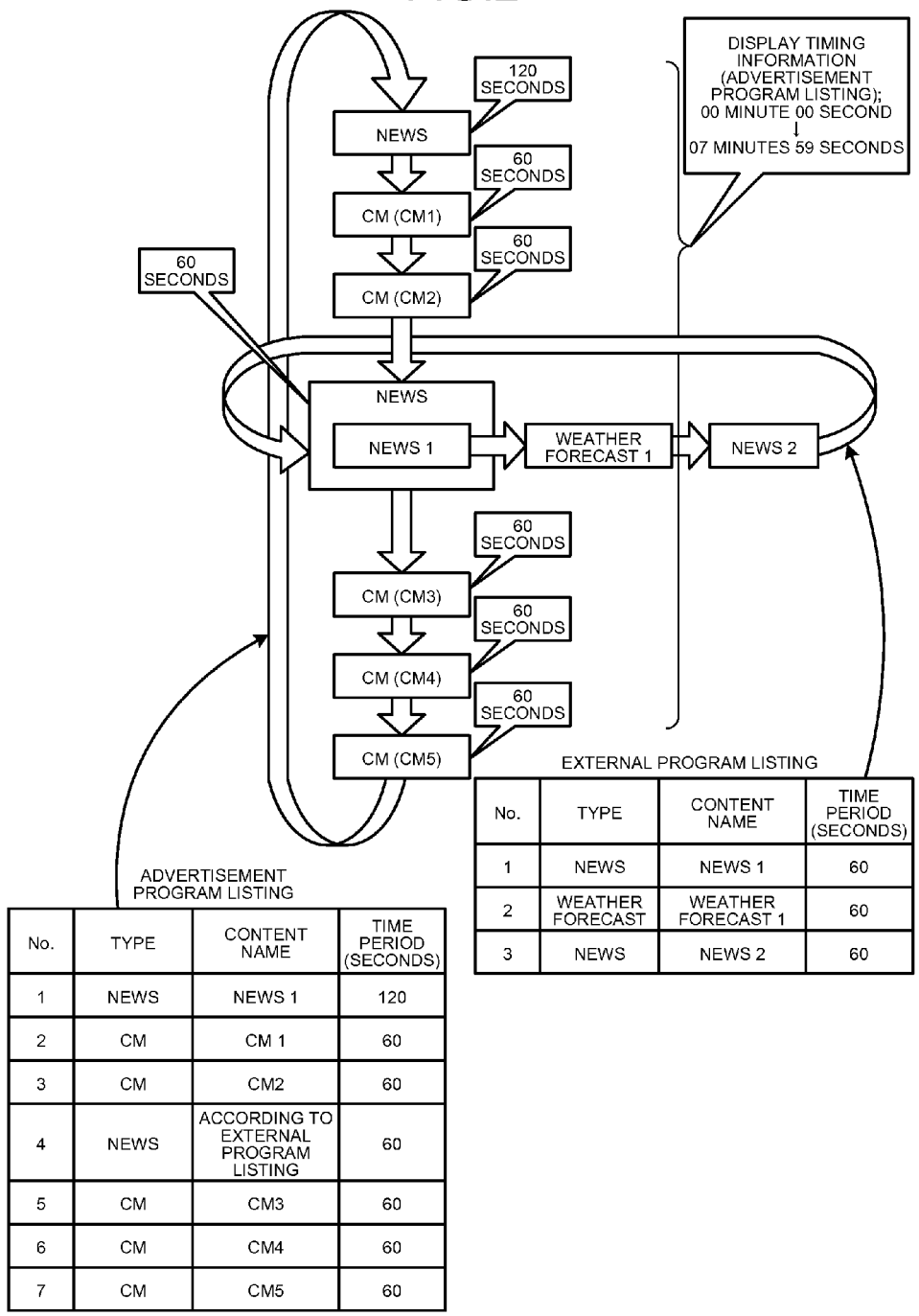

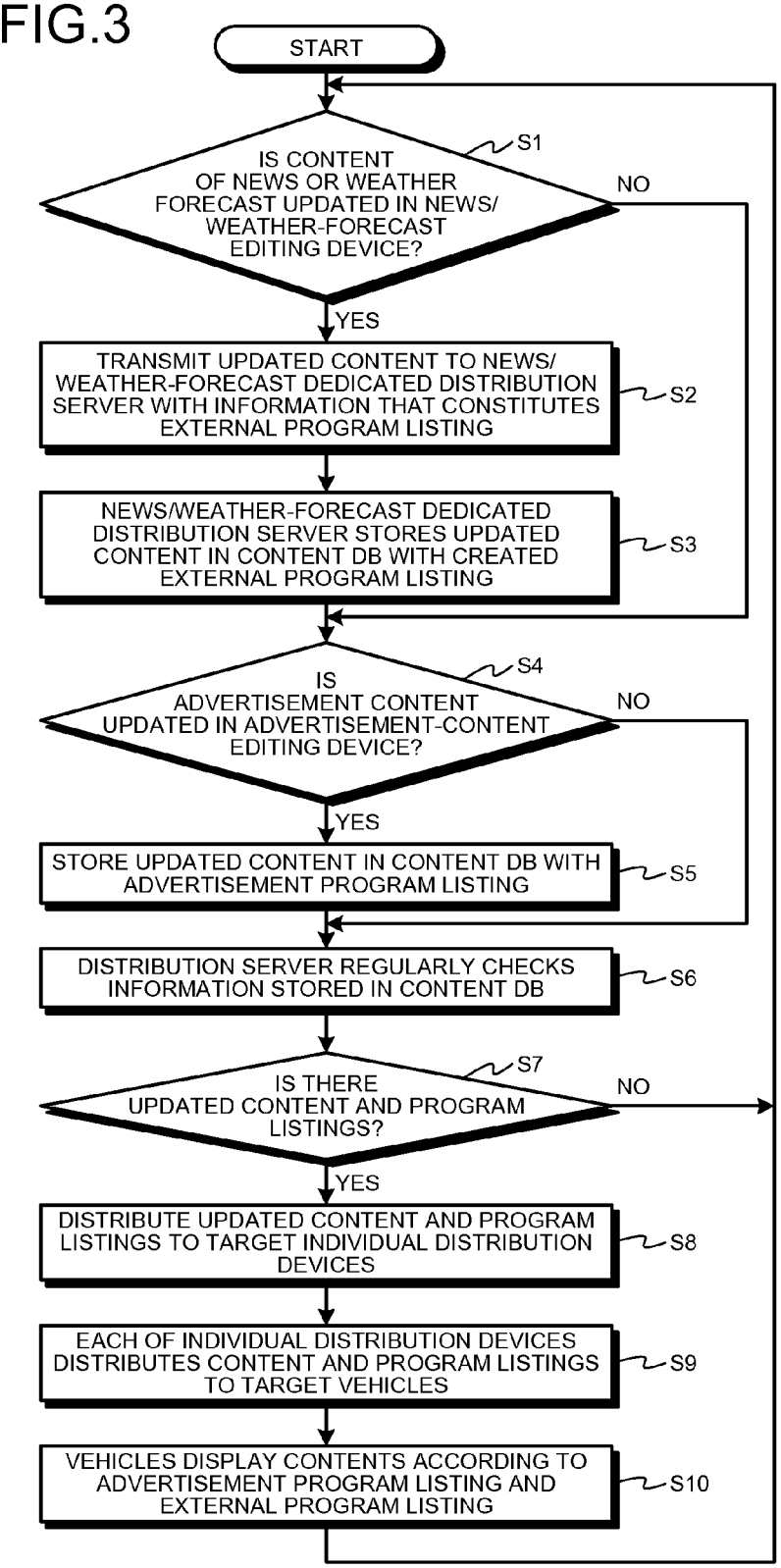

CONTENT-DISPLAY SCHEDULING SYSTEM AND CONTENT-DISPLAY SCHEDULING METHOD

FIELD

The present invention relates to a content-display scheduling system that schedules the display order of content such as advertisements and news that is displayed inside a vehicle.

BACKGROUND

There are conventionally known apparatuses that display video image information (content) such as advertisements and news inside public transportation such as trains and buses. Advertisement content is repeatedly displayed over a certain time interval, and pieces of information that have a high real-time sensitivity such as weather forecasts and news are displayed between the advertisement content. For example, Patent Literature 1 mentioned below discloses a technique in which, when an apparatus receives distribution of content via a wireless LAN, continuously distributed news videos and the like are displayed efficiently by autonomously scheduling this content by an in-vehicle terminal that has received the content.

CITATION LIST

Patent Literature

Patent Literature 1: Japanese Patent Application Laid-open No. 2005-149188

SUMMARY

Technical Problem

However, in the conventional technique described above, by the in-vehicle terminal, content with a high real-time sensitivity such as news and weather forecasts is displayed in such a manner that interrupts when content with a low real-time sensitivity such as general advertisements is displayed. Therefore, in the conventional technique, there is a problem in that the display order of content cannot be scheduled on the ground side where content to be displayed is managed.

The present invention has been achieved in view of the above problem, and an object of the present invention is to provide a content-display scheduling system that can schedule the display order of content with a low real-time sensitivity and content with a high real-time sensitivity on the ground side.

Solution to Problem

To solve the above problems and achieve the object, a content-display scheduling system that schedules a display order of content that is displayed on a display device incorporated in a vehicle, the content-display scheduling system including: a first editing device that creates or updates content with a high real-time sensitivity and information that constitutes an external program listing, where the information represents the content with a high real-time sensitivity; a first distribution server that acquires the content with a high real-time sensitivity and the information that constitutes an external program listing, and creates an external program listing showing a display order of the content with a high real-time sensitivity; a second editing device that creates or updates an advertisement program listing, which shows content with a low real-time sensitivity having a lower updating frequency than content with a high real-time sensitivity, a display order of content with a low real-time sensitivity, and also a display order that follows the external program listing; a content database that stores therein the content with a high real-time sensitivity, the content with a low real-time sensitivity, the external program listing, and the advertisement program listing; a second distribution server that periodically checks the content and the program listings stored in the content database and distributes the content and the program listings that are updated or have been added since the previous checking time; and individual distribution devices that distribute the content and the program listings that have been distributed from the second distribution the server to vehicles. The content is displayed on a display device incorporated in each of the vehicles according to the display order shown in the advertisement program listing and the external program listing.

Advantageous Effects of Invention

The content-display scheduling system according to the present invention can schedule, from the ground side, the display order of content with a low real-time sensitivity and content with a high real-time sensitivity that is displayed in a vehicle on the ground side.

BRIEF DESCRIPTION OF DRAWINGS

FIG. 2 depicts display scheduling performed by the content-display scheduling system.

FIG. 3 is a flowchart of a content-display scheduling method.

DESCRIPTION OF EMBODIMENTS

Figure 1:
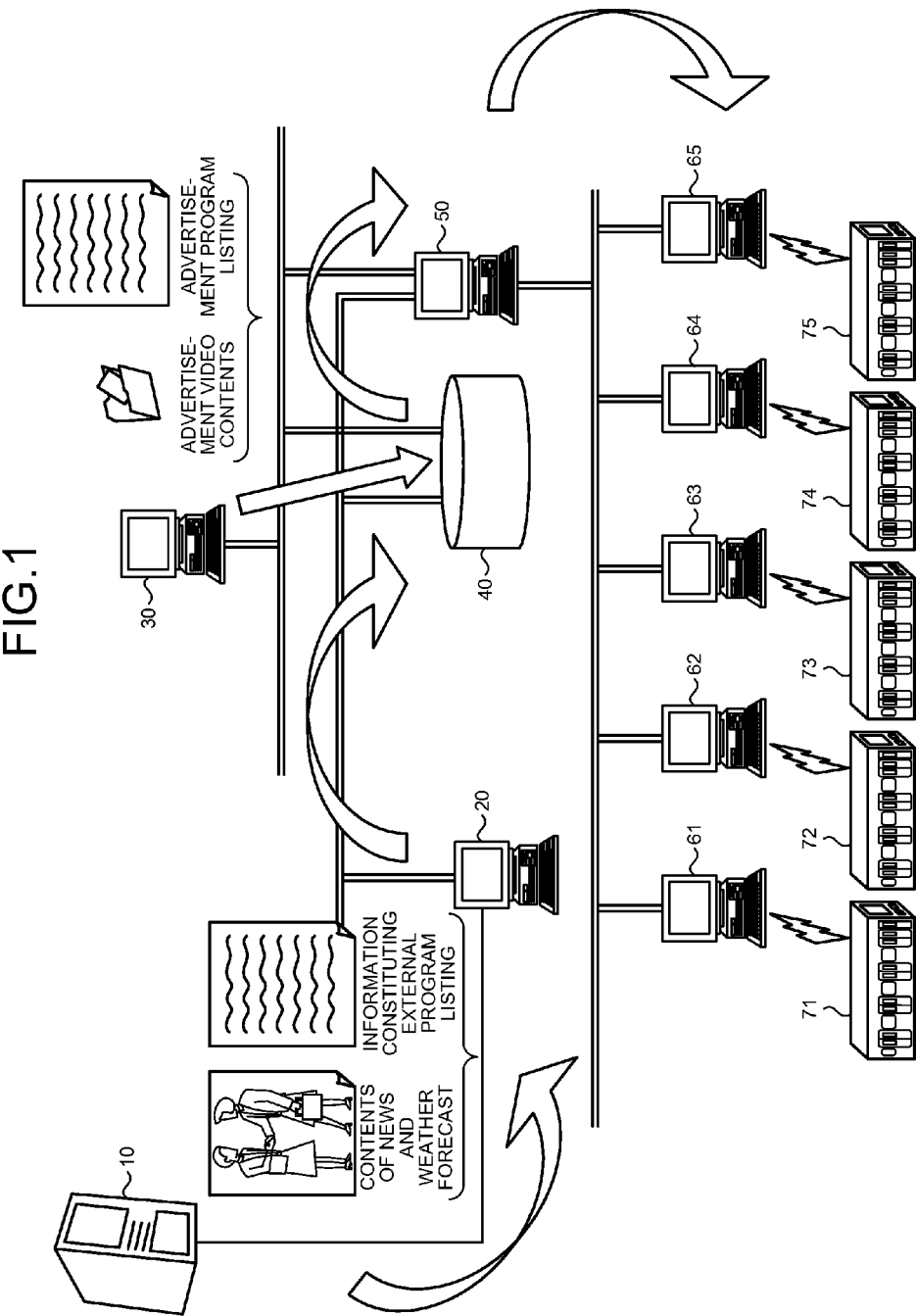
FIG. 1 is a configuration example of a content-display scheduling system.

Exemplary embodiments of a content-display scheduling system according to the present invention will be explained below in detail with reference to the accompanying drawings. The present invention is not limited to the embodiments.

Embodiment

FIG. 1 is a configuration example of a content-display scheduling system according to an embodiment of the present invention. The content-display scheduling system includes a news/weather-forecast editing device 10, a news/weather-forecast dedicated distribution server 20, an advertisement-content editing device 30, a content database (DB) 40, a distribution server 50, individual distribution devices 61 to 65, and vehicles 71 to 75. Devices except for the vehicles 71 to 75 are those installed on a ground side.

The news/weather-forecast editing device 10 is a first editing device installed at a service-providing company that provides content such as news and weather forecasts. The news/weather-forecast editing device 10 generates or updates content with a high real-time sensitivity, such as news and weather forecasts, that is provided by individual service-providing companies and information that constitutes an external program listing showing the display order of the content with a high real-time sensitivity, and transmits this content and the external program listing to a predetermined part of the news/weather-forecast dedicated distribution server 20. Because news and weather forecasts are required to be in real time in order to display the latest information, details of this content are frequently updated and transmitted on a daily basis or every several hours. While FIG. 1 depicts one news/weather-forecast editing device 10, when there are different service-providing companies for each content, such as news and weather forecasts, a plurality of news/weather-forecast editing devices 10 are connected.

The news/weather-forecast dedicated distribution server 20 is a first distribution server that registers content, such as news and weather forecasts acquired from the news/weather-forecast editing device 10, and creates an external program listing showing the display order of the content with a high real-time sensitivity such as news and weather forecasts on the basis of information that constitutes an external program listing of acquired content. When the format of the acquired content is not a format that can be reproduced by a display device incorporated in the vehicles 71 to 75, it is converted to a format that is suitable for reproduction. This content and the external program listing are then stored in a predetermined part of the content DB 40. As explained later, when there are a plurality of individual distribution devices 61 to 65 and vehicles 71 to 75, each of these devices and vehicles corresponds to each of different routes, details and display orders of content are different for each of the routes, and the news/weather-forecast dedicated distribution server 20 creates external program listings that correspond to each of the routes.

The advertisement-content editing device 30 is a second editing device that creates or updates an advertisement program listing showing advertisement videos (advertisement content) with a low real-time sensitivity, which are provided by sponsors and the like, a display order of advertisement content with a low real-time sensitivity and also a display order that follows an external programming listing. The advertisement content and the advertisement program listing are then stored in a predetermined part of the content DB 40. As for advertisements, generally, details of content are displayed as this content is contracted on a weekly basis, a two-week basis, or a monthly basis. Therefore, the advertisement content and the advertisement program listing are stored in the content DB 40 only when there is a contract for displaying new advertisement content. Similarly to the case of the external program listing, when each of the individual distribution devices 61 to 65 and the vehicles 71 to 75 corresponds to each of different routes and details and display orders of content are different for each of the routes, the advertisement-content editing device 30 creates advertisement program listings that correspond to each of the routes.

The content DB 40 is a storage unit that stores therein information on all the content and program listings distributed to the vehicles 71 to 75. In this example, the content DB 40 stores therein information related to content with a high real-time sensitivity such as news and weather forecasts, which the content DB 40 has received from the news/weather-forecast dedicated distribution server 20, external program listings, advertisement content with a low real-time sensitivity, which the content DB 40 has received from the advertisement-content editing device 30, and advertisement program listings.

The distribution server 50 is a second distribution server that checks, with a predetermined regular schedule, information stored in the content DB 40, specifically, it checks creation date and time of content such as news and weather forecasts, external program listings, advertisement content, and advertisement program listings. When there are content and program listings that have been updated since the previous checking, the updated content and program listings are read from the content DB 40 according to the advertisement program listings and external program listings each corresponding to their respective routes, and the distribution server 50 distributes the read content and program listings to individual distribution devices 61 to 65 that are designated as distribution destinations.

The individual distribution devices 61 to 65 distribute, with a one-to-one relationship, content and program listings distributed from the distribution server 50 to each vehicle (a train formation) that corresponds to each of the devices 61 to 65, respectively. Specifically, as for the individual distribution devices 61 to 65, when a train operating company is operating a plurality of routes, one individual distribution device is provided for each of the routes. Subsequently, the content and program listings are distributed to a train formation (can be plural) running on each of the routes by the corresponding individual distribution device. This distribution system is applied so that advertisements suited to passengers using the respective routes and regional news and weather forecasts are scheduled and displayed in a vehicle, because, generally, there are differences in the type of passengers depending on the route, such as business commuters, school commuters, and vacationing passengers. While a case of providing a plurality of individual distribution devices has been explained above, the present embodiment is not limited thereto, and when only one route is operated, the number of the individual distribution device can be one. Furthermore, for example, the device corresponding to the individual distribution device 61 can be provided in plural on one route. Information can be distributed to one route from a plurality of points.

The vehicles 71 to 75 are target train formations to which content and program listings are distributed from each of the corresponding individual distribution devices. Each of the vehicles 71 to 75 has incorporated therein a display device that can reproduce the content. In FIG. 1, while one vehicle corresponds to each of the individual distribution devices, as described above, each of the vehicles represents a train formation running on a different route. Therefore, in practice, corresponding individual distribution devices distribute content and program listings to all the vehicles making the train formation running on each of the routes.

The display order that the scheduling is performed in the content-display scheduling system shown in FIG. 1 is explained here. FIG. 2 depicts display scheduling performed by the content-display scheduling system.

The order of displaying content is scheduled by an advertisement program listing. The advertisement program listing is constituted by numbers (No.) indicating a display order, types, content names, and time periods. In this example, there are two news slots and five slots for commercial message (CM). For example, the advertisement program listing shows that in the first news slot, content of "News 1" are displayed for 120 seconds, and in the second CM slot, content of "CM 1" is displayed for 60 seconds. Subsequently, respective contents are repeatedly displayed every 480 seconds in the order shown in the advertisement program listing. Display timings in this case are counted from "00 minute 00 second" to "07 minutes 59 seconds".

In the fourth news slot, displayed content is changed according to an external program listing as the display is repeated. Similarly to the advertisement program listing, the external program listing is also constituted by numbers (No.) indicating a display order, types, content names, and time periods. The external program listing shows that in the fourth news slot in the advertisement program listing, content is displayed in its changed order of "News 1", "Weather forecasts 1", and "News 2". In this manner, "Weather forecasts 1" and "News 2" are displayed only once during a time period where respective advertisement content is displayed three times in rotation according to the advertisement program listing.

As described above, update timings of content are different between news and weather forecasts and advertisements. Therefore, for example, when a program listing is rescheduled by deleting old content and adding new content, there is a case where the rescheduled display order becomes different from the display order originally scheduled by the manager of the content display.

Therefore, in the present embodiment, a schedule of displaying advertisements, which have a low real-time sensitivity and less updating frequency, is shown in an advertisement program listing, and as for news and weather forecasts that have a high real-time sensitivity and a larger updating frequency, a schedule of displaying this content is shown in an external program listing, and slots arranged for displaying the contents to be displayed according to the external program listing are set in the advertisement program listing.

As shown in FIG. 2, in the entire display scheduling, the content of the News 1 is displayed in the first and fourth news slots even when details thereof are changed. Furthermore, in the entire display scheduling, the Weather forecasts 1 and the News 2 are displayed only in the fourth news slot even when details thereof are changed. Particularly in the fourth news slot, by displaying content according to an external program listing that is different from the advertisement program listing showing the entire display scheduling, even when details of content with a high real-time sensitivity are changed, a manager of this content can maintain the scheduled display order.

Next, a content-display scheduling method in the content-display scheduling system is explained. FIG. 3 is a flowchart of the content-display scheduling method.

First, in the news/weather-forecast editing device 10 installed at a service-providing company that provides news and weather forecasts, when the content of a news or weather forecast is updated (YES at Step S1), the news/weather-forecast editing device 10 transmits, at an arbitrary timing, the updated content to a predetermined part of the news/weather-forecast dedicated distribution server 20 with information that constitutes an external program listing for the updated content (Step S2).

The news/weather-forecast dedicated distribution server 20 creates an external program listing that shows a display order of content of news and weather forecasts based on the information that constitutes the acquired external program listing and stores the updated content in a predetermined part of the content DB 40 with the created external program listing (Step S3). At this time, when the acquired content is not in a format that can be reproduced by a display device in the vehicles 71 to 75, the format is converted to a format that is suitable for reproduction. When the content of the news or weather forecasts is not updated (NO at Step S1), the processes at Steps S2 and S3 described above are omitted.

Next, in the advertisement-content editing device 30 installed at a department that manages advertisements and the like provided by sponsors, when advertisement content is updated (YES at Step S4), the advertisement-content editing device 30 updates an advertisement program listing that shows the display order of advertisement content corresponding to updated content and a display order according to the external program listing, and stores the updated content and the advertisement program listing in a predetermined part of the content DB 40 (Step S5). When the advertisement content are not updated (NO at Step S4), the process at Step S5 described above is omitted.

The distribution server 50 regularly checks information stored in the content DB 40 (Step S6). Specifically, the stored information represents respective content (content with a high real-time sensitivity such as news and weather forecasts, and advertisement content with a low real-time sensitivity) and respective program listings (the external program listing and the advertisement program listing). When there is updated content or program listings (YES at Step S7), specifically, when the updated date and time of respective content and respective program listings are checked and there are updated content and program listings during a time period since the previous checking before the current checking, the distribution server 50 reads the updated content and program listings and distributes them to target individual distribution devices 61 to 65 (Step S8).

Each of the individual distribution devices 61 to 65 distributes the content and program listings having been distributed from the distribution server 50 to the respective target vehicles 71 to 75 (Step S9).

Each of the vehicles 71 to 75 displays the content on a display device incorporated in the vehicles themselves according to the advertisement program listing and the external program listing (Step S10). At this time, while each of the vehicles 71 to 75 displays their respective content according to the schedule of the advertisement program listing, as for the slots that follow the external program listing as items of the advertisement program listing, the content is displayed according to the schedule of the external program listing.

In the content-display scheduling system, after finishing the process at Step S10 and when the distribution server 50 checks the content DB 40 and has confirmed that there is no updated content (NO at Step S7), the operation returns to Step S1 and processes described above are performed repeatedly.

In this manner, in the vehicles 71 to 75, as for advertisement content that is not frequently updated is displayed according to a fixed schedule (an advertisement program listing), and the content of the news and weather forecasts that are frequently updated is displayed according to a schedule of an external program listing in slots specified in advance in the advertisement program listing. With this configuration, in the vehicles 71 to 75, content with a high real-time sensitivity such as news and weather forecasts and advertisement content with a low real-time sensitivity can be displayed according to display schedules of an advertisement program listing and an external program listing that are created on a ground side.

When content and the like are distributed from the distribution server 50 to each of the individual distribution devices 61 to 65, and when content and the like are distributed from each of the individual distribution devices 61 to 65 to each of the corresponding vehicles 71 to 75, content with a high real-time sensitivity and an external program listing is distributed in preference to content with a low real-time sensitivity and an advertisement program listing. Because content containing videos take a large amount of memory capacity, there is a case where all of content to be distributed cannot be distributed in one distribution process. Therefore, content with a high real-time sensitivity and an external program listing are distributed with a high priority. With this configuration, content can be updated to its latest state from content with a high real-time sensitivity.

Furthermore, when content and the like are distributed from the distribution server 50 to each of the individual distribution devices 61 to 65, and when content and the like are distributed from each of the individual distribution devices 61 to 65 to each of the corresponding vehicles 71 to 75, only updated content and program listings are distributed. For example, in a case where content with a high real-time sensitivity is updated and an external program listing is updated accordingly, an advertisement program listing is not updated and only the updated content and the external program listing are distributed. In this case, as compared to a case where all the content and program listings are distributed, the amount of information to be distributed can be reduced. Further, it is generally conceivable that when content of news and weather forecasts with a high real-time sensitivity is updated, an external program listing is also updated, and when advertisement content with a low real-time sensitivity is updated, an advertisement program listing is also updated. However, for example, when only an external program listing and an advertisement program listing are updated to change only a display order, only the program listing is distributed.

While a case where content is updated has been explained above, the present embodiment is not limited thereto. The processes described above can be applied even when content is newly created and added or when content is deleted.

As explained above, in the present embodiment, in the content-display scheduling system, an external program listing that shows a display order of content with a high real-time sensitivity such as news and weather forecasts, and an advertisement program listing that shows a display order of advertisement content with a low real-time sensitivity and also a display order that follows the external program listing are created. When content is displayed on a display device in a vehicle, the content is displayed according to the advertisement program listing, and, in the advertisement program listing, in slots according to the external program listing, content is displayed according to the external program listing. With this configuration, content with a low real-time sensitivity and content with a high real-time sensitivity that are displayed in a vehicle can be displayed with a display order scheduled on the ground side.

REFERENCE SIGNS LIST 10 news/weather-forecast editing device
20 news/weather-forecast dedicated distribution server
30 advertisement-content editing device
40 content DB
50 distribution server
61, 62, 63, 64, 65 individual distribution device
71, 72, 73, 74, 75 vehicle

The invention claimed is:

1. A content-display scheduling system that schedules a display order ascending or descending in time of content that is displayed on a display device incorporated in a vehicle, the content-display scheduling system comprising:
a first editing device that creates or updates content with a high real-time sensitivity and information that constitutes an external program listing, where the information represents the content with a high real-time sensitivity;
a first distribution server that acquires the content with a high real-time sensitivity and the information that constitutes an external program listing, and creates an external program listing showing a first display order ascending or descending in time of the content with a high real-time sensitivity;
a second editing device that creates or updates an advertisement program listing, which shows content with a low real-time sensitivity having a lower updating frequency than content with a high real-time sensitivity, a second display order ascending or descending in time of content with a low real-time sensitivity, wherein the advertisement program listing includes one or more time slots respectively designated for the content with a high real-time sensitivity that follows the first display order ascending or descending in time;
a content database that stores therein the content with a high real-time sensitivity, the content with a low real-time sensitivity, the external program listing, and the advertisement program listing;
a second distribution server that periodically checks the content and the program listings stored in the content database and distributes the content and the program listings that are updated or have been added since the previous checking time; and
individual distribution devices that distribute the content and the program listings that have been distributed from the second distribution server to vehicles,
wherein the content is displayed on a display device incorporated in each of the vehicles according to the second display order ascending or descending in time shown in the advertisement program listing and the first display order ascending or descending in time shown in the external program listing,
wherein the content with a low real-time sensitivity is displayed on the display device according to the second display order ascending and descending in time shown in the advertisement program listing, while the content with a high real-time sensitivity is displayed on the display device according to the first display order ascending and descending in time shown in the external program listing in the one or more designated time slots included in the advertisement program listing, and
wherein the one or more designated time slots for the content with high real-time sensitivity are maintained in the advertisement program listing when the external program listing is updated.

2. The content-display scheduling system according to claim 1, wherein the second distribution server and the individual distribution devices distribute the content with a high real-time sensitivity and the external program listing in preference to the content with a low real-time sensitivity and the advertisement program listing.

3. The content-display scheduling system according to claim 1, wherein
when a plurality of individual distribution devices are provided for each of routes on which vehicles are operated, wherein content to be displayed, an advertisement program listing and an external program listing to be used are different for each of the routes,
the second distribution server distributes content and program listings that are updated or have been added since the previous checking time to corresponding one of respective target individual distribution devices, and
each of the individual distribution devices distributes the content and the program listings distributed from the second distribution server to each of the vehicles operated on the routes corresponding to its own distribution device.

4. A content-display scheduling method in a content-display scheduling system that schedules content that is displayed on a display device incorporated in a vehicle, the content-display scheduling method comprising:
a first content creating and storing step of creating or updating content with a high real-time sensitivity and an external program listing showing a first display order ascending or descending in time of the content with a high real-time sensitivity, and of storing the content with a high real-time sensitivity and the external program listing in a content database;
a second content creating and storing step of creating or updating an advertisement program listing, which shows content with a low real-time sensitivity having a lower updating frequency than the content with a high real-time sensitivity, a second display order ascending or descending in time of the content with a low real-time sensitivity, wherein the advertisement program listing includes one or more time slots respectively designated for the content with a high real-time sensitivity that follows the first display order ascending or descending in time, and of storing the content with a low real-time sensitivity and the advertisement program listing in the content database;
a first distribution step at which a distribution server periodically checks the content and the program listings stored in the content database and distributes the content and the program listings that are updated or have been added since the previous checking time to individual distribution devices;
a second distribution step at which the individual distribution devices distribute the content and the program listings that have been distributed from the distribution server to vehicles; and
a content display step at which a display device incorporated in each of the vehicles displays the content on each of the display devices according to the second display order ascending or descending in time shown in the advertisement program listing and the first display order ascending or descending in time shown in the external program listing, wherein the content with a low real-time sensitivity is displayed on the display device according to the second display order ascending and descending in time shown in the advertisement program listing, while the content with a high real-time sensitivity is displayed on the display device according to the first display order ascending and descending in time shown in the external program listing in the one or more designated time slots included in the advertisement program listing, and wherein the one or more designated time slots for the content with high real-time sensitivity are maintained in the advertisement program listing when the external program listing is updated.

5. The content-display scheduling method according to claim 4, wherein
at the first distribution step, the distribution server distributes the content with a high real-time sensitivity and the external program listing in preference to the content with a low real-time sensitivity and the advertisement program listing, and
at the second distribution step, the individual distribution devices distribute the content with a high real-time sensitivity and the external program listing in preference to the content with a low real-time sensitivity and the advertisement program listing.

6. The content-display scheduling method according to claim 4, wherein
in the content-display scheduling system, when a plurality of individual distribution devices are provided for each of routes on which vehicles are operated, wherein content to be displayed, an advertisement program listing and an external program listing to be used are different for each of the routes,
at the first distribution step, the distribution server distributes the content and the program listings that are updated or have been added since the previous checking time to corresponding one of respective target individual distribution devices, and
at the second distribution step, each of the individual distribution devices distributes the content and the program listings distributed from the distribution server to each of the vehicles operated on the routes corresponding to its own distribution device.

7. The content-display scheduling method according to claim 5, wherein
in the content-display scheduling system, when a plurality of individual distribution devices are provided for each of routes on which vehicles are operated, and content to be displayed, an advertisement program listing and an external program listing to be used are different for each of the routes,
at the first distribution step, the distribution server distributes the content and the program listings that are updated or have been added since the previous checking time to corresponding one of respective target individual distribution devices, and
at the second distribution step, each of the individual distribution devices distributes the content and the program listings distributed from the distribution server to each of the vehicles operated on the routes corresponding to its own distribution device.

8. The content-display scheduling method according to claim 4, wherein at the content display step, the second display order ascending or descending in time shown in the advertisement program listing and the first display order ascending or descending in time shown in the external program listing establish display sequences of respective content.

9. The content-display scheduling system according to claim 2, wherein when a plurality of individual distribution devices are provided for each of routes on which vehicles are operated, and content to be displayed, an advertisement program listing and an external program listing to be used are different for each of the routes,
the second distribution server distributes content and program listings that are updated or have been added since the previous checking time to corresponding one of respective target individual distribution devices, and
each of the individual distribution devices distributes the content and the program listings distributed from the second distribution server to each of the vehicles operated on the routes corresponding to its own distribution device.

10. The content-display scheduling system according to claim 1, wherein the first display order ascending or descending in time of the content with a high real-time sensitivity and the second display order ascending or descending in time of the content with a low real-time sensitivity establish display sequences of respective content.

* * * * *